US012392381B2

(12) United States Patent
Ruiz et al.

(10) Patent No.: US 12,392,381 B2
(45) Date of Patent: Aug. 19, 2025

(54) CONSTANT VELOCITY JOINT BOOT WITH A SPLIT SEAL

(71) Applicant: RB Distribution, Inc., Colmar, PA (US)

(72) Inventors: Ricardo Llorente Ruiz, Perkasie, PA (US); Daniel E. Theobold, Center Valley, PA (US); Jason M. Fetchko, Hazleton, PA (US); John Iden, Perkasie, PA (US)

(73) Assignee: RB Distribution, Inc., Colmar, PA (US)

( * ) Notice: Subject to any disclaimer, the term of this patent is extended or adjusted under 35 U.S.C. 154(b) by 501 days.

(21) Appl. No.: 17/860,384

(22) Filed: Jul. 8, 2022

(65) Prior Publication Data

US 2024/0011529 A1    Jan. 11, 2024

(51) Int. Cl.
*F16D 3/84*    (2006.01)
(52) U.S. Cl.
CPC ........... *F16D 3/845* (2013.01); *Y10S 464/905* (2013.01)
(58) Field of Classification Search
CPC ............................. F16D 3/845; Y10S 464/905
USPC ........................................................ 464/175
See application file for complete search history.

(56) References Cited

U.S. PATENT DOCUMENTS

| 4,558,869 | A | * | 12/1985 | Grove | F16J 3/046 |
| | | | | | 464/175 |
| 4,936,811 | A | * | 6/1990 | Baker | F16D 3/2055 |
| | | | | | 464/175 |
| 5,472,072 | A | * | 12/1995 | Bumgarner | F16F 9/003 |
| | | | | | 277/636 |
| 6,139,027 | A | * | 10/2000 | Biekx | F16J 3/045 |
| | | | | | 464/175 |
| 8,136,816 | B1 | * | 3/2012 | Lou | F16J 3/045 |
| | | | | | 277/636 |

FOREIGN PATENT DOCUMENTS

| JP | 2002310183 A | 10/2002 |
| JP | 2005201418 A | 7/2005 |
| JP | 4237146 B2 | 3/2006 |

* cited by examiner

*Primary Examiner* — Greg Binda
(74) *Attorney, Agent, or Firm* — Volpe Koenig (57) ABSTRACT

A boot assembly for a constant velocity joint. The boot has mating segments to encase the CV joint housing. A split seal is configured to open and pass over the CV joint housing and mate with the CV joint housing without dissembling the related drive components. The interior of the seal is configured for use with circular and non-circular CV joint housings.

4 Claims, 8 Drawing Sheets

CONSTANT VELOCITY JOINT BOOT WITH A SPLIT SEAL

FIELD OF INVENTION

The invention generally relates to a protective boot or cover for a constant-velocity joint, also known as homokinetic or CV joints, which generally require some form of lubrication for smooth operation. More particularly, the invention relates to the combination of a covering and sealing assembly that retains the lubrication and protects against debris. Most particularly, the invention relates to a covering and sealing assembly with a split seal and a split boot that provides improve assembly options while protecting against loss of the joint's lubrication or the ingress of debris.

BACKGROUND

There have been a number of different constant velocity ("CV") joints developed over the years. The known CV joints use some type of a flexible joint connected to a shaft and enables the shaft to assume different operating angles in operation. These CV joints are usually protected by a flexible boot or encasement with circular ends dimensioned to fit around the shaft and the circular housing, and the ends of the boot or encasement are secured in place with a suitable fastener. Over time, some CV joint housings became non-circular and sealing the circular boot to the non-circular shape became more difficult.

An additional problem with the know solutions was the need to disassembly some CV joint parts to make a repair. While there are some known boots with a side slit that allowed them to be applied without disassembly of the drive parts, there are no known seals with a side slit for CV joints that eliminate the need to disassemble drive parts to apply them.

Accordingly, the industry desires a seal and a CV joint assembly that provides an easy to apply, effective seal for CV joint body having a variable outer diameter.

SUMMARY

The Applicant's solution provides an assembly that encases both ends of the CV joint without requiring disassembly of the joint. A boot or encasement is provided for connecting together around a CV joint. A first end of the joined boot pieces is dimensioned to surround a shaft associated with the constant velocity joint and a second end is dimensioned to surround a sealing insert that is fitted to the joint housing. A split seal is opened and applied around the housing without disassembly the CV joint. The split seal has an interior surface that is dimensioned to complement the CV joint housing and an exterior diameter that complements the interior of the protective boot.

BRIEF DESCRIPTION OF THE DRAWINGS

FIG. 13 illustrates an alternative FIG. 11 is another embodiment of a seal according to the invention of the boot according to the invention.

DETAILED DESCRIPTION OF THE PREFERRED EMBODIMENTS

The invention will be described in detail with reference to the above described drawings, wherein the same or similar elements are identified with the same number.

Figure 1:
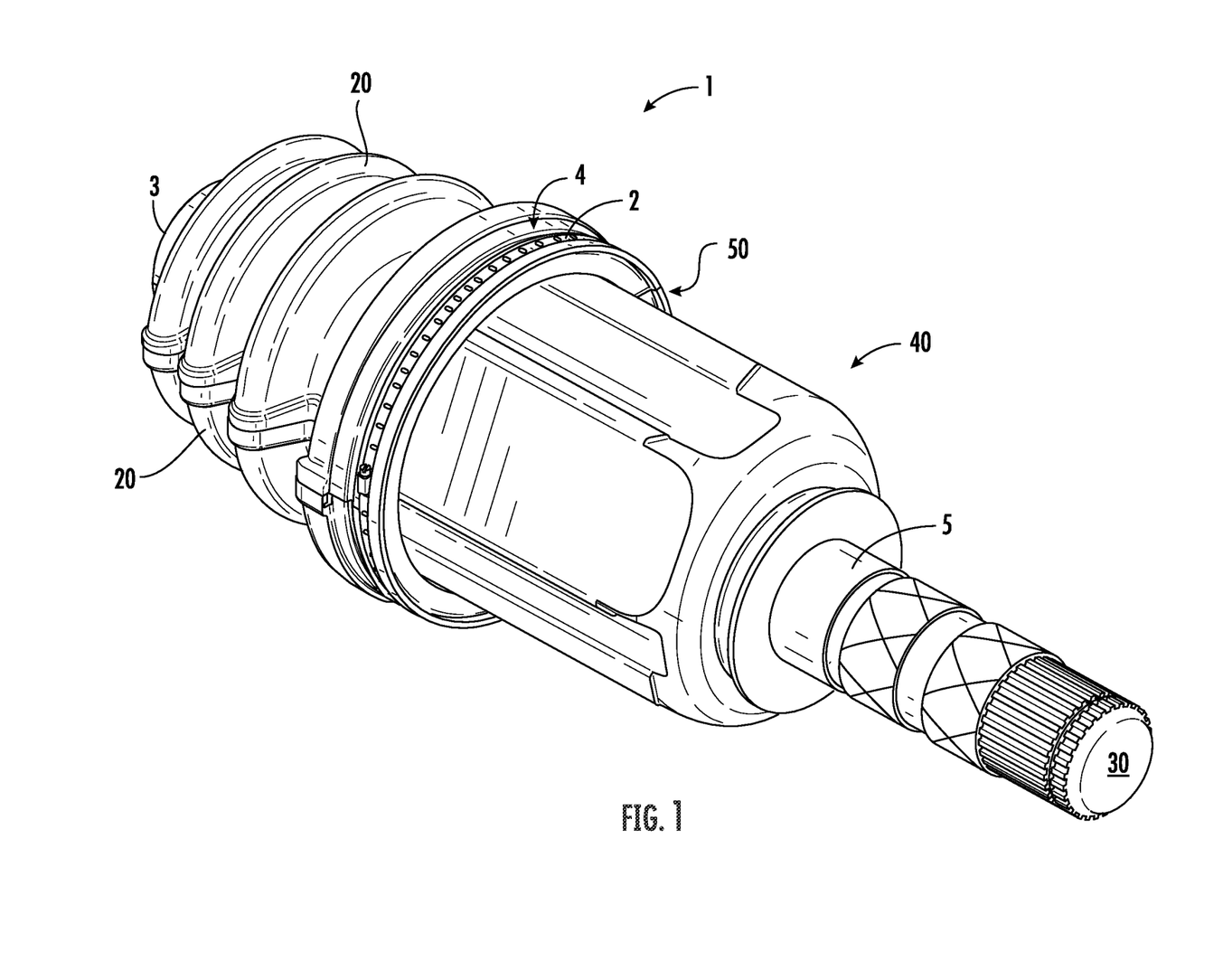
FIG. 1 illustrates an assembled boot on the cup of a CV joint.

With reference to FIG. 1, there is illustrated a CV boot 1 in accordance with the invention as it would appear on the cup or housing 40 of a constant velocity ("CV") joint. The boot 1 is retained in place by adjustable fasteners, such as the clamps 2. The larger end 4 of the boot is secured around a seal which will be explained in more detail below and the smaller end 3 is secured around a shaft 5 that extends from the cup 40 and is associated with the vehicle's drive train. This configuration is typical in the art and will be know to those of skill in the art.

Figure 2:
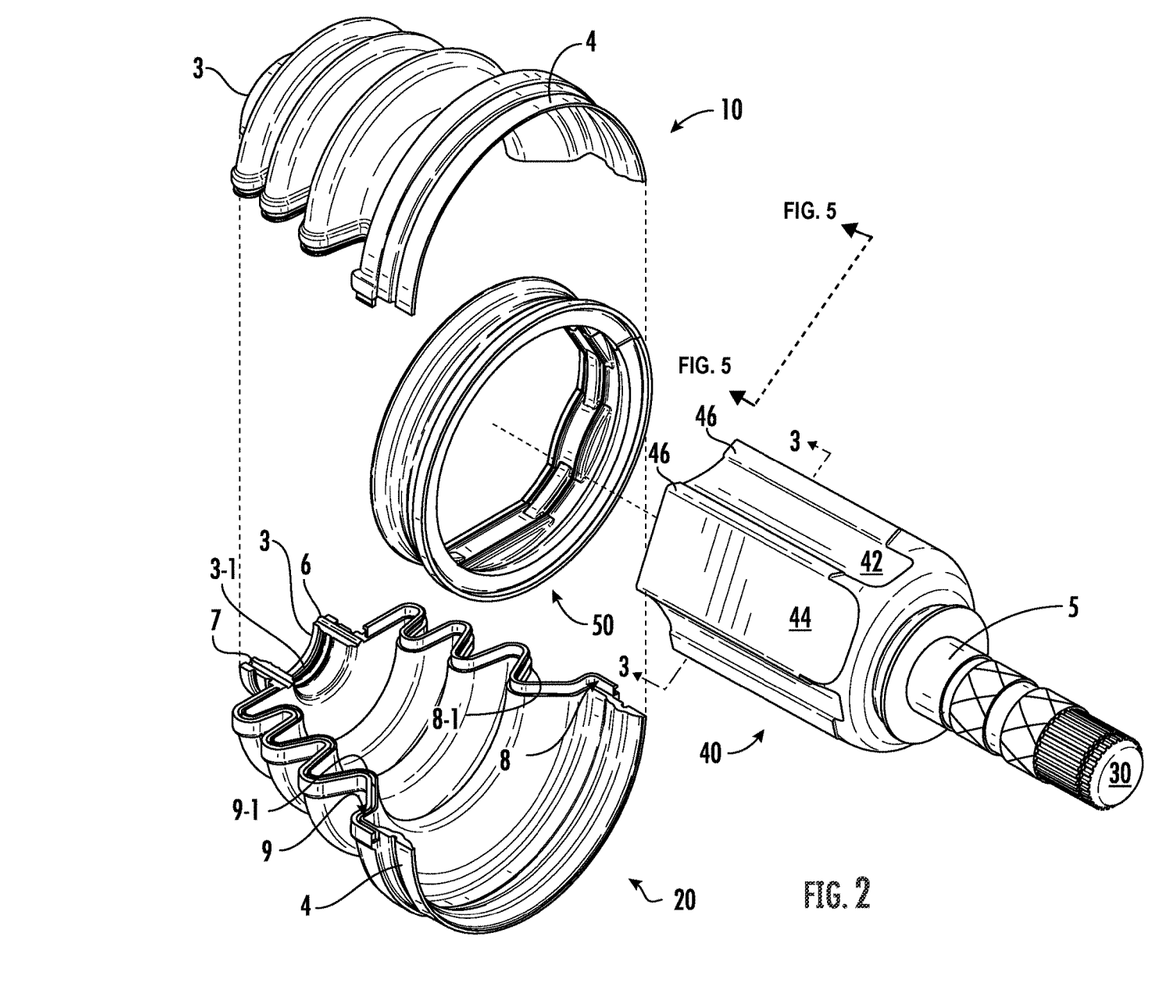
FIG. 2 is an exploded view of the components in FIG. 1.
Figure 3:
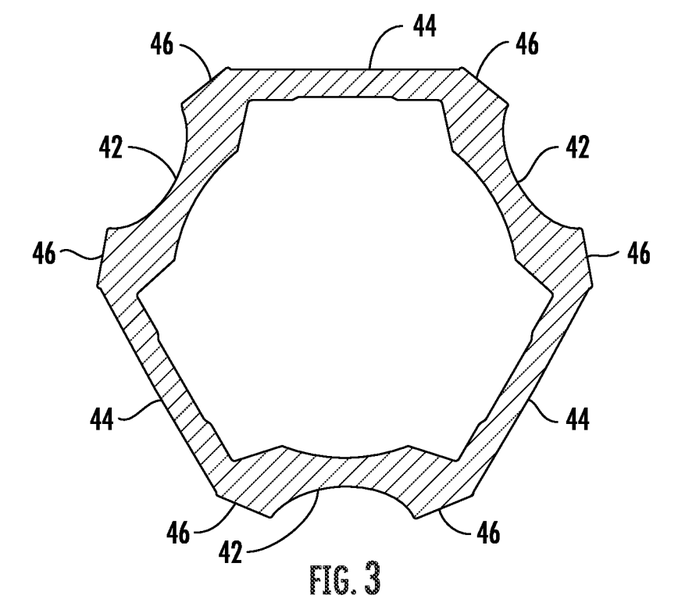
FIG. 3 is a section in the direction of the arrows 3-3 in FIG. 2.

FIG. 2 is exploded view of the components in FIG. 1 except for the fasteners 2. The illustrated CV joint cup or housing 40 has a number of axially extending concave portions 42 and a number of planar portions 44 that are separated by angular portions 46, see the section in FIG. 3. In order to effective seal with the geometry of housing 40, the seal 50 must have an interior configuration that is complementary to the exterior of the housing 40 and an exterior configuration that complements the interior diameter that results from the assembly of the boot half sections 10 and 20 when assembled together as an encasement.

As shown in FIG. 2, the assembled boot halves 10 and 20 of FIG. 1 define an internal area sufficient to encase the housing 40 and any lubricant. At least the end 3 on the boot half sections 10 and 20 have oppositely arranged projections 6 and grooves 7 that mate when the ends are clamped in position. The bellows or corrugated configuration of the boot half sections 10 and 20 result in the sinusoidal edges 8 and 9. The oppositely facing projection 8-1 and groove 9-1 arranged axially along the respective one of the sinusoidal edges 8 and 9. The projection 8-1 and the groove 9-1 have complementary shapes that interlock and seal the sinusoidal edges, see FIGS. 5 and 6B. Preferably, an adhesive or sealant, such as Permatex® 30 Minute Epoxy, is applied to the seams.

Figure 4:
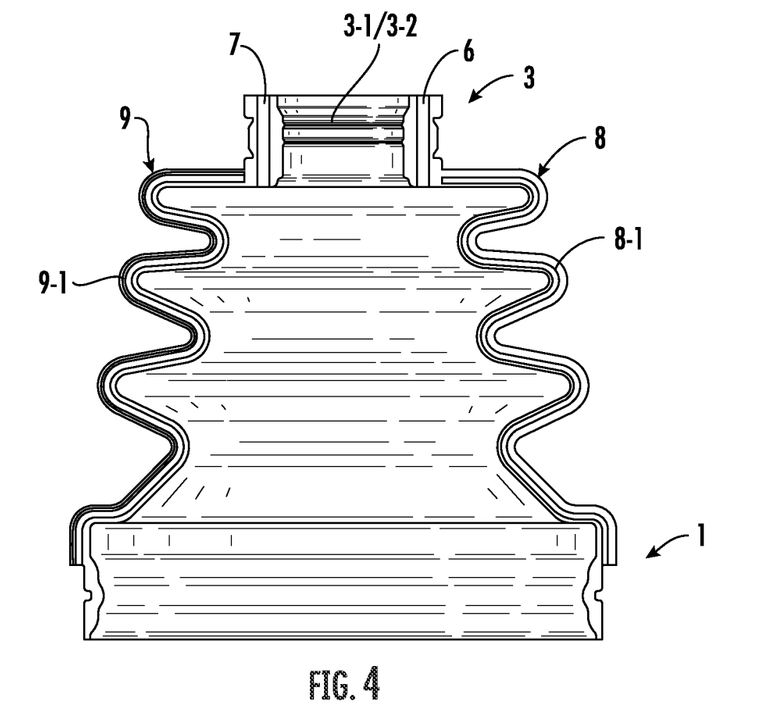
FIG. 4 illustrates one half of the boot in FIG. 2.

The end portions 3 of the boot halves 10 and 20 have radial projections 3-1 and 3-2 and radial projections 6 and grooves 7. The radial projections 3-1 and 3-2 are formed as half circles, between the oppositely arranged projection 6 and groove 7, which seal against the shaft 5 under the pressure of the fastener or clamps 2, see FIGS. 4, 5 and 6A. Here again, an adhesive or sealant, such as Permatex® 30 Minute Epoxy, is preferably applied to the seams.

Figure 5:
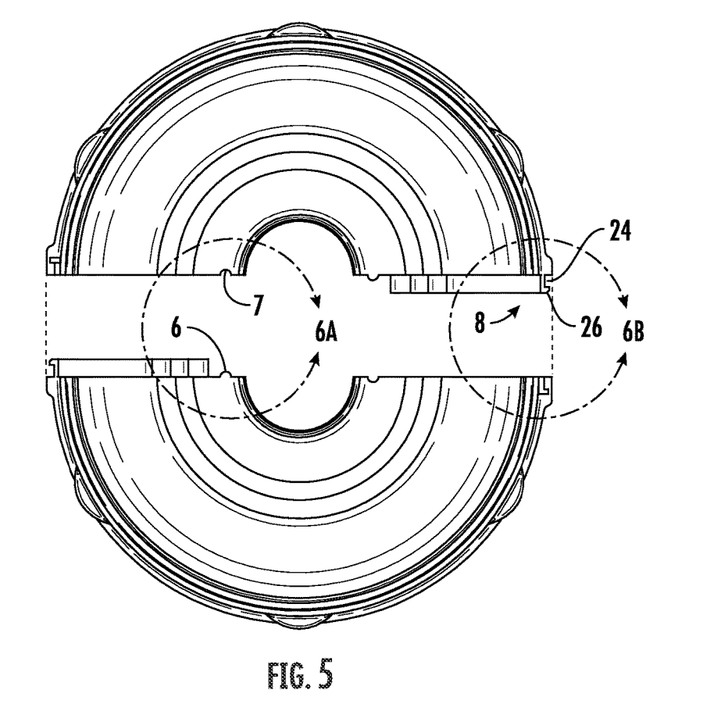
FIG. 5 illustrates and end view of the boot in the direction of the arrows 5 in FIG. 2.
Figures 6A, 6B:
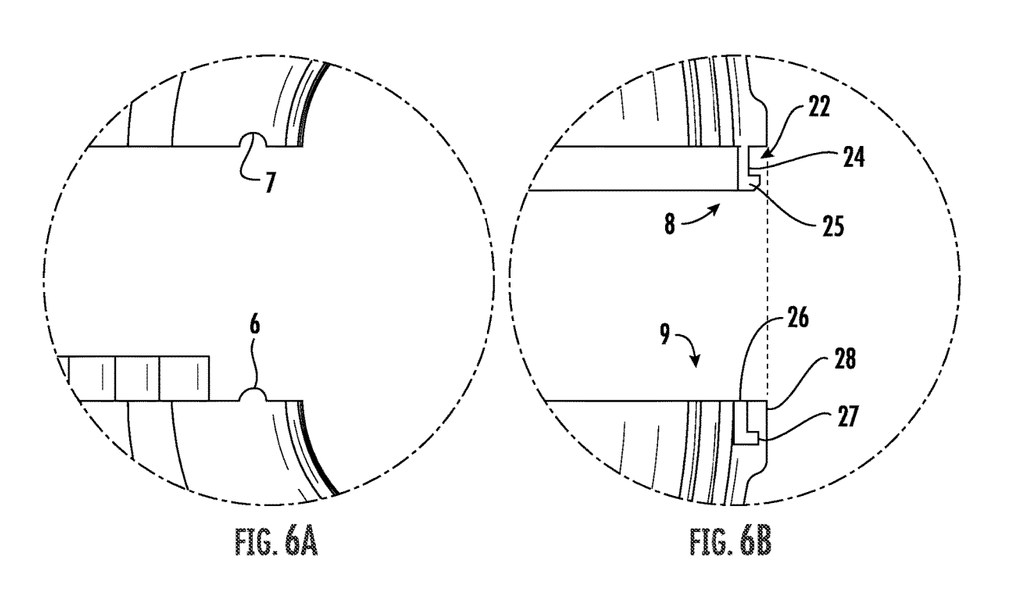
FIG. 6A is an exploded view of the encircled area 6A of the CV joint shaft end in FIG. 5.
FIG. 6B is an exploded view of the encircled area 6B of the CV joint body end in FIG. 5.

With reference to FIGS. 5 and 6B, the mating of the boot halves 10 and can be seen in more detail. The projection 8 has a horizontal recess 22 that extends inward to the wall 24 and forms the outwardly extending lip 25. The groove 9 has a vertical recess 26 that joins with an internal horizontal relief 27 to form an inwardly directed projection 28, see FIG. 6B. When the boot halves 10 and 20 are assembled together, the lip 25 will be within the relief 27 and the projection 28 will be in the recess 22.

Figures 7A, 7B:
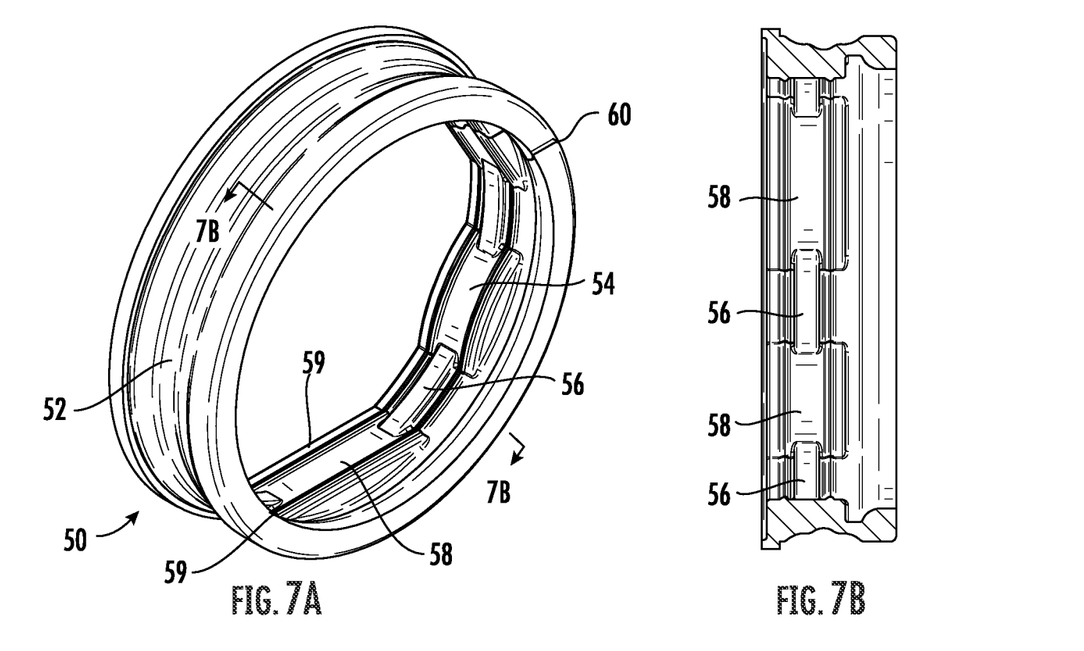
FIG. 7A is illustrates the seal in FIG. 2.
FIG. 7B is a section along the lines 7B-7B in FIG. 7A.

With reference to FIGS. 7A and 7B, the seal 50 has the interior configuration shown in FIG. 2. The exterior diameter and configuration 52 are selected to complement the interior configuration of the assemble ends 4-1 and 4-2. The interior configuration complements the exterior of the housing 40. Recesses 42 mate with the projections 54, the planar portions 44 mate with the surfaces 58 and the angular portions mate with the sloped portion 56. The outer edges of projections 54, surfaces 58, and sloped portions 56 have projecting ridges 59 that form sealing surfaces against the respective elements of housing 40. The seal 50 is slit at 60 so the seal can open and pass over any shaft or drive train component associated with rear of the housing 40 and then be slipped on the housing 40. As shown in FIG. 7A, the slit 60 is at an acute angle. Further, the slit 60 extends between the outer diameter of the seal 50 and the inner diameter of the seal 50. This avoids the need to disassemble components in order to replace a damaged or defective seal or boot.

Figure 8A:
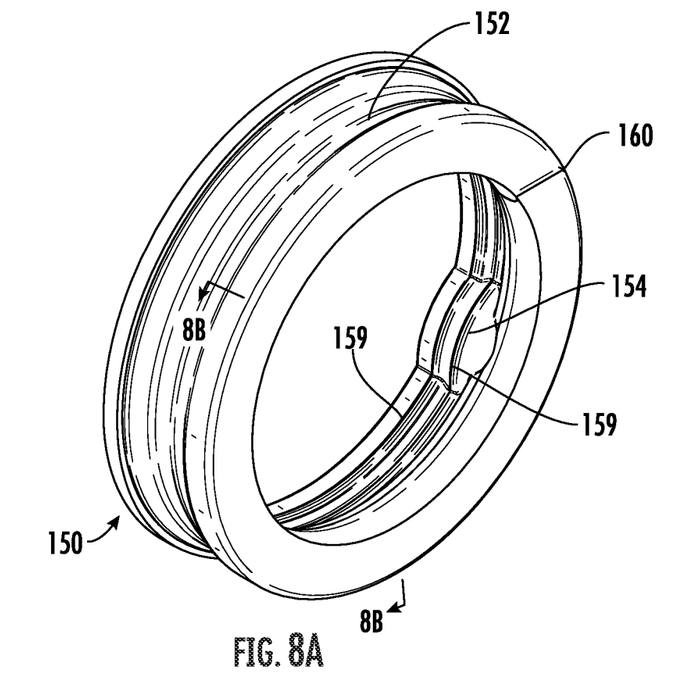
FIG. 8A is another embodiment of a seal according to the invention.
Figure 8B:
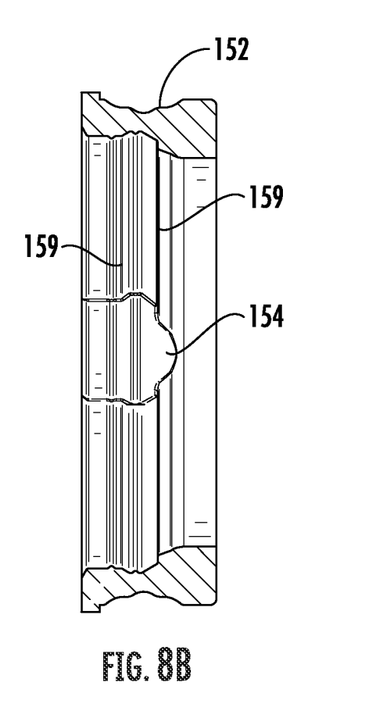
FIG. 8B is a section view along the lines 8B-8B in FIG. 8A.

With reference to FIGS. 8A and 8B, the seal 150 has an interior with an alternative configuration. The exterior diameter and configuration 152 are selected to complement the interior configuration of the assemble ends 4-1 and 4-2, like the prior embodiment. The interior configuration complements the exterior of a housing having a different non-circular exterior from the housing 40. The projections 154 are configured to mate with recesses formed in the outer surface of the specific housing. As with the prior embodiment, projecting ridges 159 form sealing surfaces against the surface of the housing. Like the prior embodiment, the slit 160 in seal 150 permits the seal 150 to open and pass over any shaft or drive train component associated with CV joint and then be mated to the CV joint. This again avoids the need to disassemble components in order to simply replace a damaged or defective seal or boot.

Figure 9A:
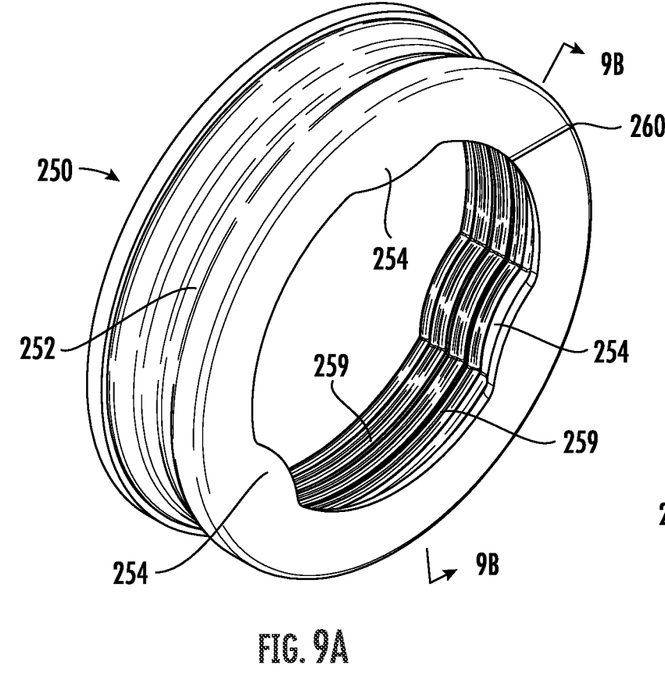
FIG. 9A is another embodiment of a seal according to the invention.
Figure 9B:
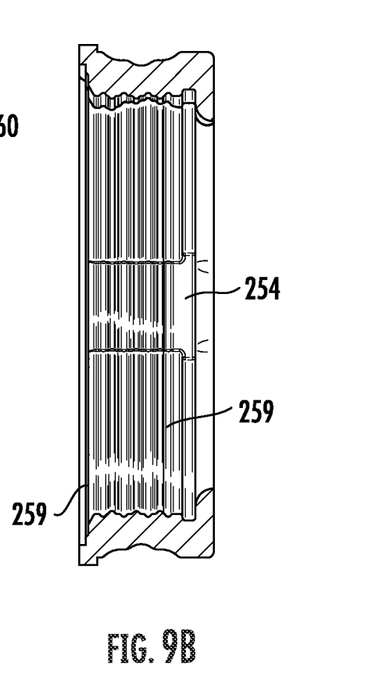
FIG. 9B is a section view along the lines 9B-9B in FIG. 9A.

With reference to FIGS. 9A and 9B, the seal 250 has an interior with a second alternative configuration. The exterior diameter and configuration 252 are selected to complement the interior configuration of the assemble ends 4-1 and 4-2, like the prior embodiments. The interior configuration complements the exterior of a housing having a different non-circular exterior from the housing 40. The projections 254 are configured to mate with recesses formed in the outer surface of the specific housing. As with the prior embodiment, projecting ridges 259 form sealing surfaces against the surface of the housing. Here again, the slit 260 in seal 250 permits the seal 250 to open and pass over any shaft or drive train component associated with CV joint and then be mated to the CV joint. This again avoids the need to disassemble components in order to simply replace a damaged or defective seal or boot.

Figures 10A, 10B:
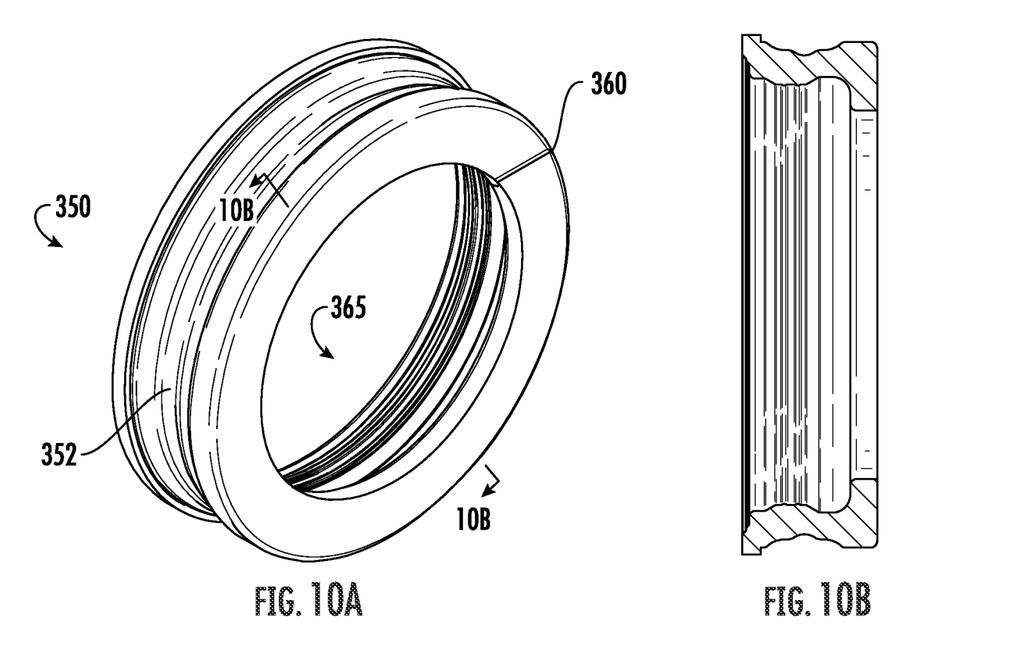
FIG. 10A is another embodiment of a seal according to the invention.
FIG. 10B is a section view along the lines 10B-10B in FIG. 10A.

With reference to FIGS. 10A and 10B, the seal 350 has an interior with another alternative configuration. The exterior diameter and configuration 352 are selected to complement the interior configuration of the assemble ends 4-1 and 4-2, like the prior embodiments. The interior configuration 365 complements the exterior of a housing having a CV joint with a circular exterior. Once again, the slit 360 in seal 350 permits the seal 350 to open and pass over any shaft or drive train component associated with CV joint and then be mated to the CV joint. This again avoids the need to disassemble components in order to simply replace a damaged or defective seal or boot.

Figure 11:
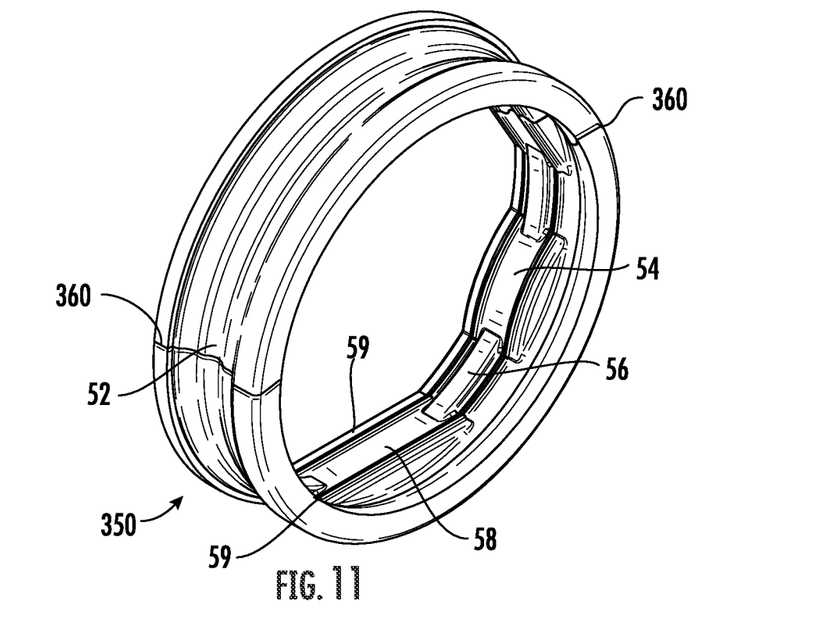
FIG. 11 is another embodiment of a seal according to the invention.

With reference to FIG. 11, there is illustrated a seal 350 that has an interior configuration like the seal 50 in FIG. 7A, Seal 350 deferrers in that it has two slits, which provides a two part seal that can be applied to the housing 40 without disassembling the CV joint. Like the prior embodiments of the seal, an adhesive or sealant, such as Permatex® 30 Minute Epoxy, is preferably applied to the two part of the seal along the seams.

Figure 12:
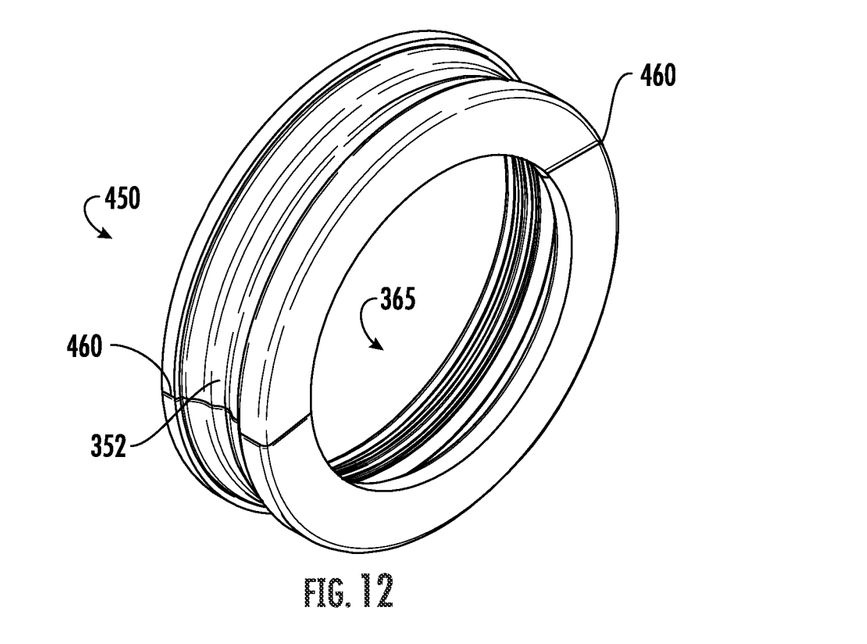
FIG. 12 is another embodiment of a seal according to the invention.

With reference to FIG. 12, there is illustrated a seal 450 that has an interior configuration like the seal 350 in FIG. 10A, Seal 450 deferrers in that it has two slits, which provides a two part seal that can be applied to the housing 40 without disassembling the CV joint. Like the prior embodiments of the seal, an adhesive or sealant, such as Permatex® 30 Minute Epoxy, is preferably applied to the two part of the seal along the seams.

Figure 13:
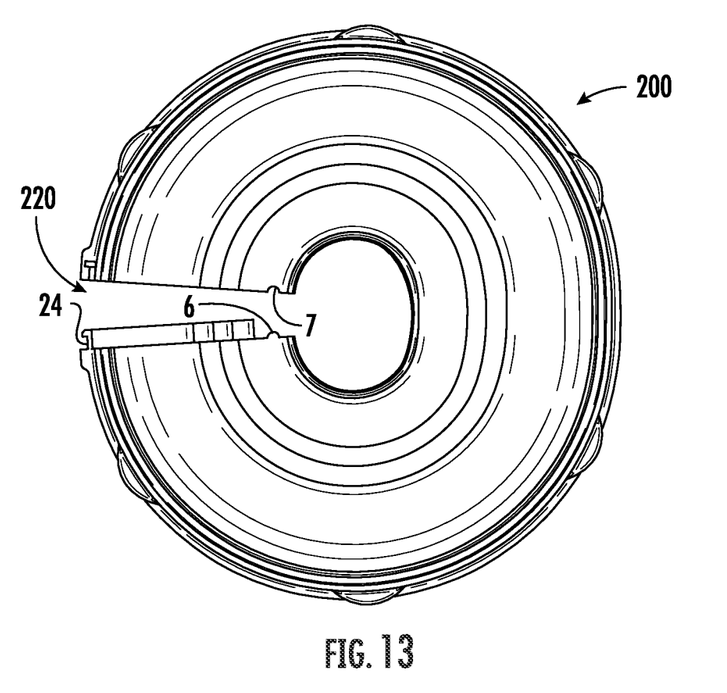

With reference to FIG. 13, there is illustrated an alternative boot 200 with a slit 220 on one side so that the boot opens in a clam shell fashion. The slit 220 is configured like that illustrated in connection with the earlier embodiment in FIGS. 5, 6A, and 6B. Like the prior embodiments of the boot, an adhesive or sealant, such as Permatex® 30 Minute Epoxy, is preferably applied to the two part of the seal along the seams.

As can be seen from the above, each embodiments of the present invention provides both a seal and a CV boot that can be applied without disassembling the CV joint.

What is claimed is:

1. An assembly for encasing a portion of a constant velocity joint having a housing with a predetermined non-circular outer surface, the assembly comprising:
   a split boot, a split seal, and at least two fasteners;
   the split boot has a first end configured for surrounding a shaft associated with the constant velocity joint and a second end that is configured to complement an outer diameter of the split seal;
   the split seal has a non-circular inner diameter configured to complement the non-circular outer surface of the housing and is arranged only at the second end of the split boot; and,
   a respective fastener of the at least two fasteners surrounds an outer diameter of a respective one of the first end and the second end of the split boot and fastens the respective first end or second end in place;
   whereby the non-circular inner diameter of the split seal and the non-circular outer surface of the housing are secured in complementary contact.

2. The assembly of claim 1, wherein the split seal is slit at an acute angle.

3. The assembly of claim 1, wherein the split boot has at least two segments with male and female edges that extend between the first end and second end of the split boot segments for mating the segments together.

4. The assembly of claim 3, wherein the split seal has a slit that extends between the outer diameter of the seal and the inner diameter of the seal.

\* \* \* \* \*